(12) United States Patent
Wyatt (10) Patent No.: US 9,939,072 B2
(45) Date of Patent: Apr. 10, 2018

(54) NOISE REDUCTION RELIEF VALVE FOR CRYOGENIC LIQUID CONTAINERS

(71) Applicant: Engineered Controls International, LLC, Elon, NC (US)

(72) Inventor: Aaron Dominic Wyatt, Hillsborough, NC (US)

(73) Assignee: Engineered Controls International, LLC, Elon, NC (US)

( * ) Notice: Subject to any disclaimer, the term of this patent is extended or adjusted under 35 U.S.C. 154(b) by 0 days.

(21) Appl. No.: 14/854,296

(22) Filed: Sep. 15, 2015

(65) Prior Publication Data

US 2016/0084394 A1 Mar. 24, 2016

Related U.S. Application Data

(60) Provisional application No. 62/052,945, filed on Sep. 19, 2014, provisional application No. 62/182,249, filed on Jun. 19, 2015.

(51) Int. Cl.
| | | |
|---|---|---|
| *F16K 15/04* | (2006.01) | |
| *F16K 17/04* | (2006.01) | |
| *F17C 13/04* | (2006.01) | |
| *F16K 15/02* | (2006.01) | |
| *F16K 47/08* | (2006.01) | |

(52) U.S. Cl.
CPC ........ *F16K 17/0413* (2013.01); *F16K 15/028* (2013.01); *F16K 17/0433* (2013.01); *F16K 47/08* (2013.01); *F17C 13/04* (2013.01); *F17C 2205/0332* (2013.01); *F17C 2205/0382* (2013.01); *F17C 2250/0663* (2013.01)

(58) Field of Classification Search
CPC .... F16K 17/0413; F16K 15/028; F16K 47/08; F16C 13/04; F17C 2205/0332; F17C 2205/033
USPC .................................................. 137/538, 540
See application file for complete search history.

(56) References Cited

U.S. PATENT DOCUMENTS 1,013,483 A * 1/1912 Gaa .......................... F01N 1/165
137/478
2,133,461 A * 10/1938 McAbee ................... F17C 7/00
220/304

(Continued)

FOREIGN PATENT DOCUMENTS

| FR | 717651 A | 1/1932 |
|---|---|---|
| GB | 1085347 | 9/1967 |
| WO | WO2013170749 A1 | 11/2013 |

OTHER PUBLICATIONS

International Search Report and Written Opinion for PCT/US2015/050385 dated Dec. 1, 2015, 13 pp.

(Continued)

*Primary Examiner* — Craig Schneider
*Assistant Examiner* — P. Macade Nichols
(74) *Attorney, Agent, or Firm* — Neal, Gerber & Eisenberg LLP (57) ABSTRACT

A relief valve coupled to a container is disclosed. The relief valve may include a valve body forming an internal chamber, an inlet portion connected to the chamber and configured to receive content flow from the container, a spring, a poppet including a seat disc, wherein a spring force exerted by the spring biases the seat disc towards the inlet portion, and a cap configured to include a plurality of passages.

24 Claims, 5 Drawing Sheets

(56) References Cited

U.S. PATENT DOCUMENTS

| | | | | |
|---|---|---|---|---|
| 2,273,737 | A | * | 2/1942 | Snyder ............... B60K 15/0406 137/39 |
| 2,449,683 | A | * | 9/1948 | Akerman .............. F16K 15/028 137/543.21 |
| 4,161,996 | A | | 7/1979 | Dolejsi |
| 4,611,671 | A | * | 9/1986 | Hansson ................. B25F 5/006 173/162.2 |
| 4,612,962 | A | | 9/1986 | Purvis |
| 4,982,879 | A | * | 1/1991 | Corrado ............... B67D 1/0412 222/399 |
| 5,520,214 | A | * | 5/1996 | MacK ..................... F16K 1/306 137/505.34 |
| 6,036,169 | A | * | 3/2000 | Wass ....................... F16K 17/06 138/89.3 |
| 6,178,994 | B1 | | 1/2001 | Park |
| 6,554,099 | B2 | * | 4/2003 | Uegane ................. B60K 13/04 181/275 |
| 7,086,414 | B2 | * | 8/2006 | Phillips ................... F16K 1/305 137/505.35 |
| 7,096,884 | B2 | * | 8/2006 | Mackal ................. F16K 15/028 137/540 |
| 7,469,713 | B2 | * | 12/2008 | Mackal ................... F16K 15/18 137/522 |
| 2005/0115616 | A1 | * | 6/2005 | Mackal ................. F16K 15/028 137/540 |
| 2014/0311593 | A1 | * | 10/2014 | Fawcett .............. F16K 17/0433 137/470 |
| 2014/0331704 | A1 | * | 11/2014 | Kondrk .............. F16K 17/0413 62/190 |
| 2016/0084394 | A1 | * | 3/2016 | Wyatt ................. F16K 17/0413 220/203.27 |

OTHER PUBLICATIONS

"Mufflers and Breathers," Poly Conn Brochure, Version 2014 1.0, Mar. 5, 2014, 10 pp.

* cited by examiner

NOISE REDUCTION RELIEF VALVE FOR CRYOGENIC LIQUID CONTAINERS

CROSS-REFERENCE TO RELATED APPLICATIONS

This application claims the benefit of U.S. Provisional Patent Application No. 62/052,945, filed Sep. 19, 2014, and U.S. Provisional Patent Application No. 62/182,249, filed Jun. 19, 2015, both of which are incorporated herein by reference in their entirety.

BACKGROUND

Relief valves are used to control or limit the pressure in a system or vessel which can build up in the vessel. In particular, relief valves are used on containers such as cryogenic cylinders containing industrial cryogenic liquids (Nitrogen, Argon, Oxygen, etc.) to allow pressurized gas built up in the container to flow out from the relief valve. This may help to prevent failure of the container. Cryogenic liquids stored in containers pose a particular challenge because pressure is always building in the container as the cryogenic temperature is around −295° F. It follows that relief valves can be found installed onto such containers to release gas pressure.

Containers stored or installed indoors, such as at research facilities and hospitals, present an additional problem as the release of pressure from the relief valve can be noisy. When this takes place in a laboratory setting, for example, where delicate work is being conducted, the noise can disrupt the working environment. Further, current Occupational Safety and Health Administration (OSHA) requirements state that a permissible exposure limit is 90 decibels for an 8-hour shift; any exposure over this limit requires hearing protection. In addition, for each increase of 5 decibels above the 90-decibel limit, the exposure time is cut in half. Thus, a valve which can effectively relieve pressure in a pressurized container while reducing the discharging noise is desirable.

SUMMARY

The present disclosure describes a pressure relief valve configured to control or limit pressure build up in a container. More specifically, a pressure relief valve is disclosed for use with containers, such as containers housing cryogenic liquids to allow pressurized gases within the container to be released through the pressure relief valve in the event of a pressure buildup. By allowing pressurized gas to be released through the pressure relief valve, this may help prevent failure of the container. The pressure relief valve described herein is designed to replace a first relief valve in a multi valve assembly used on pressurized containers. For example, the pressure relief valve described herein may be a first relief valve in a three-part valve assembly, where the first pressure relief valve cycles open and closed to keep the pressure controlled, a second valve corresponds to a second pressure relief valve which opens to protect the vessel if the pressure continues to build even with the first relief valve operating, and a third valve corresponds to a burst disc valve which discharges if the first two relief valves cannot handle the pressure built up in the container to protect the container from catastrophic failure. The pressure relief valve described herein may be installed on containers stored located indoors and/or placed near employees and/or in work areas.

The pressure relief valve described herein is designed to reduce noise caused by the release of pressure from the container such that the noise level is within the range of normal conversation when discharging, for example, from a typical 200 liter container for storing cryogenic liquids. The pressure relief valve described herein may also be designed to reduce noise levels for a gas being released from a container to be within OSHA standards for sound exposure in a work environment.

To reduce noise level, the valve disclosed herein includes a cap with a plurality of passages that change the direction of and evenly distribute the flow of gas out of the valve, resulting in a further slowing of the velocity of the gas escaping the valve and the noise associated with the escaping gas, and in turn reducing the noise level. The passages also provide a further safety advantage of directing flow from the valve through a plurality of outlets in various directions, rather than the full flow through a single outlet, such that if a user is close to the valve at discharge, the full stream of escaping gas will not be directed through the single outlet passage toward a user. The valve may also include an inlet that is smaller in diameter than a typical relief valve used in cryogenic containers, which reduces the flow of gas into the valve so that there is less gas creating flow noise. The inlet is still sized appropriately to allow sufficient flow from the container, but the reduced diameter as compared to a typical such relief valves provides a decrease in gas flow and corresponding noise.

According to some embodiments, a relief valve coupled to a container is disclosed. The relief valve comprises a valve body forming an internal chamber, an inlet portion connected to the chamber and configured to receive content flow from the container, a spring, a moveable poppet, wherein a spring force exerted by the spring biases the poppet towards a closed position to close the valve, and a cap engaged to the valve body and including a plurality of passages, wherein each of the plurality of passages has a separate axis that is generally perpendicular to the central axis of the valve body.

Other objects, advantages, features, properties and relationships of the invention will be obtained from the following detailed description and accompanying drawings which set forth illustrative embodiments that are indicative of the various ways in which the principles of the invention may be employed.

DETAILED DESCRIPTION

The description that follows describes, illustrates and exemplifies one or more embodiments of a pressure relief valve in accordance with its principles. This description is not provided to limit the pressure relief valve to the embodiments described herein, but rather to explain and teach the principles of the pressure relief valve in order to enable one of ordinary skill in the art to understand these principles and, with that understanding, be able to apply them to practice not only the embodiments described herein, but also other embodiments that may come to mind in accordance with these principles. The scope of the present disclosure is intended to cover all such embodiments that may fall within the scope of the appended claims, either literally or under the doctrine of equivalents.

FIGS. 1-6 show a preferred embodiment of an improved noise reduction pressure relief valve 10 configured to be installed on a container 100 holding pressurized contents (e.g., cryogenic container storing pressurized gas). The relief valve 10 is a spring-loaded poppet relief-type valve coupled to a container 100, such as a cryogenic cylinder containing industrial cryogenic liquids (e.g., Nitrogen, Argon, Oxygen). As container 100 is stored with cryogenic liquids, gas may form within container 100, thus increasing a pressure within container 100. Relief valve 10 is configured to allow the pressurized gases to flow from the relief valve 10 in the event of a pressure buildup to prevent failure of container 100.

Relief valve 10 may be a first relief valve in a multi-part relief valve assembly as described above. It follows that relief valve 10 is designed to open at a preset pressure, such that when a pressure in container 100 exceeds the preset pressure of relief valve 10 for causing release of gas from container 100, relief valve 10 will open to allow the pressure in container 100 to be reduced by allowing gases to exit through relief valve 10. The pressure within container 100 may have been caused due to ambient thermal warming of the cryogenic liquid stored within container 100.

Figure 3:
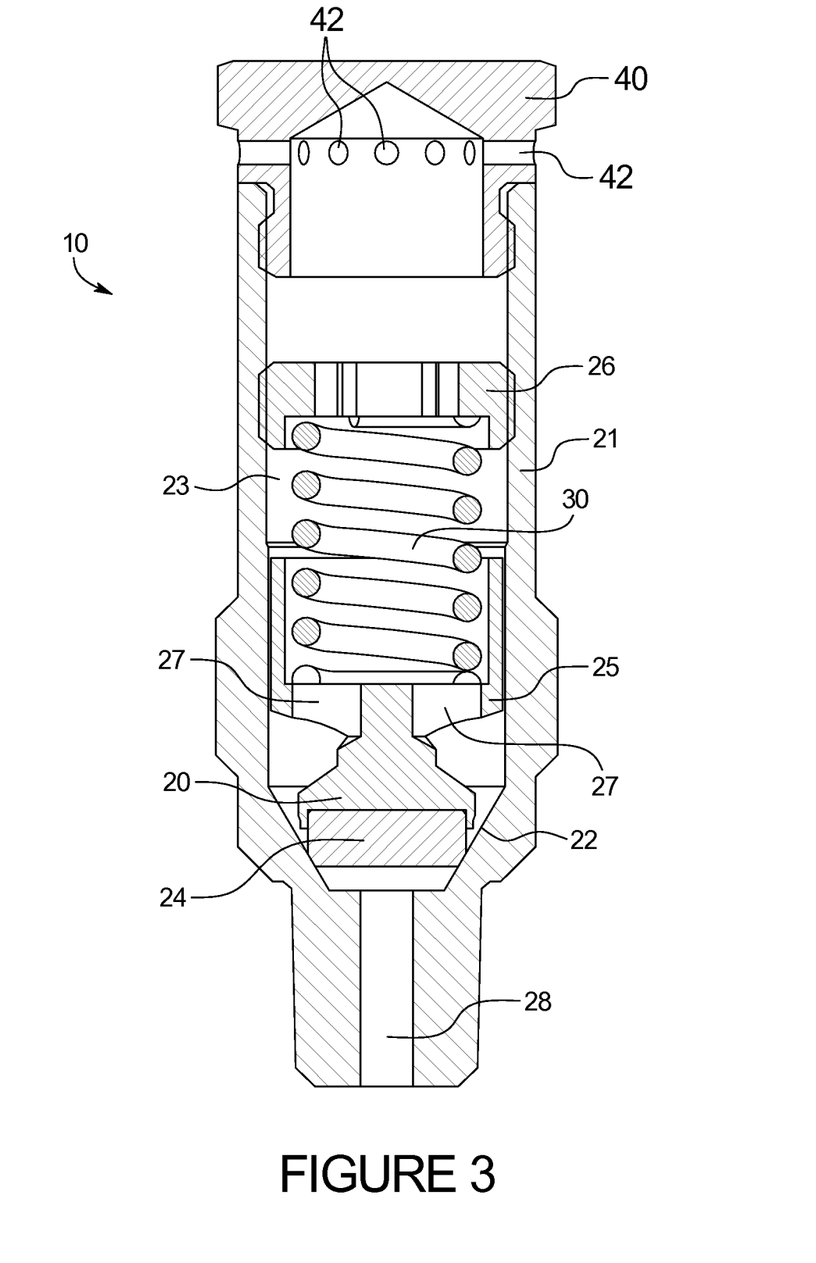
FIG. 3 is a cross-sectional front view of the relief valve of FIG. 1.
Figure 4:
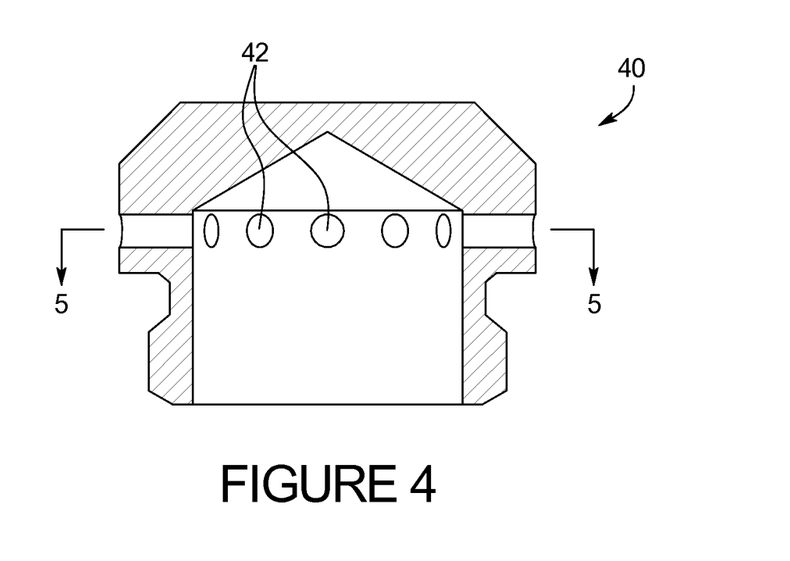
FIG. 4 is a cross-sectional front view of a cap portion of the relief valve of FIG.

FIG. 3 illustrates relief valve 10 including a valve inlet 28 located at a proximal end of a valve body 21 and configured to be connected to an interior of container 100. A movable poppet 20 is disposed in chamber 23 formed in valve body 21, and spring 30 is configured and located to exert a spring force down on a top seat 25 of movable poppet 20 so that seat disc 24 maintains a sealing engagement with valve seat 22 to close valve inlet 28. At an opposite end of spring 30, spring 30 contacts spring top 26 disposed within valve body 21. When the pressure in container 100 exceeds the preset pressure of relief valve 10, the force of the pressure within container 100 overcomes the spring force of spring 30 being exerted on movable poppet 20 to keep seat disc 24 over valve inlet 28. Thus when the pressure in container 100 exceeds the preset pressure of relief valve 10, movable poppet 20 is allowed to move up and seat disc 24 correspondingly is lifted off from the valve inlet 28 which allows pressurized gas from container 100 to flow through a chamber 23 defined by an interior of the valve body 21, and out through a plurality of passages 42 included in a cap 40. Cap 40 is located at a distal end of relief valve 10 that is opposite from valve inlet 28, and may be connected thereto by means of threads.

Spring top 26 may be an adjustable cam for adjusting the spring force exerted by spring 30 on seat disc 24. For example, when spring top 26 is adjusted towards seat disc 24, the compression of spring 30 increases and correspondingly the spring force exerted by spring 30 on seat disc 24 increases. This adjustment of spring top 26 can also be seen to be an adjustment to the preset pressure of relief valve 10 as now the pressure within container 100 must be greater to overcome the increased spring force exerted by spring 30 on seat disc 24 to lift seat disc 24 off the valve inlet 28. Conversely, spring top 26 may be adjusted away from seat disc 24, which decreases the compression of spring 30 and correspondingly decreases the spring force exerted by spring 30 on seat disc 24. This adjustment of spring top 26 can be seen to be an adjustment to the preset pressure of relief valve 10 as now the pressure within container 100 can be less to overcome the decreased spring force exerted by spring 30 on seat disc 24 to lift seat disc 24 off the valve inlet 28.

Figure 5:
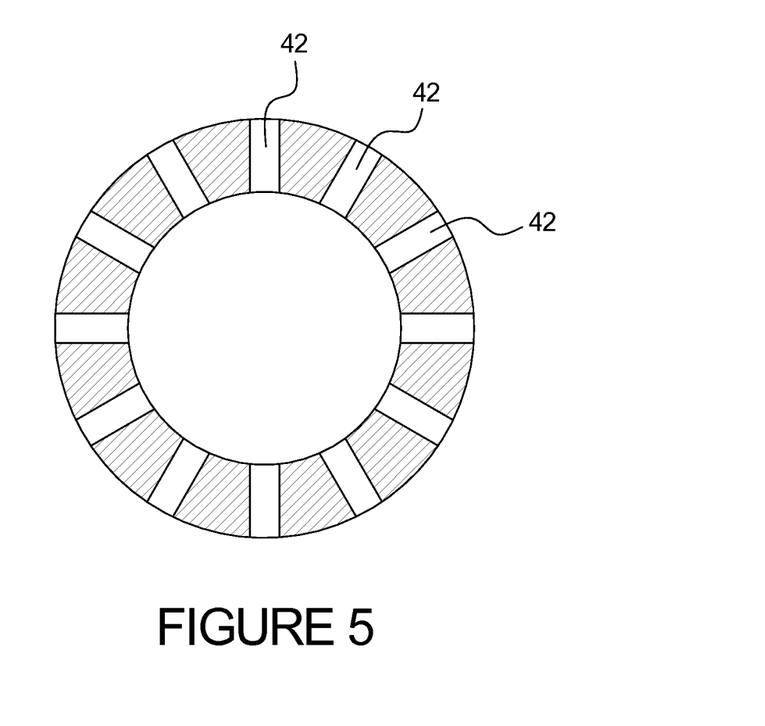
FIG. 5 is cross-sectional view along Section 5-5 of FIG. 4.
Figure 6:
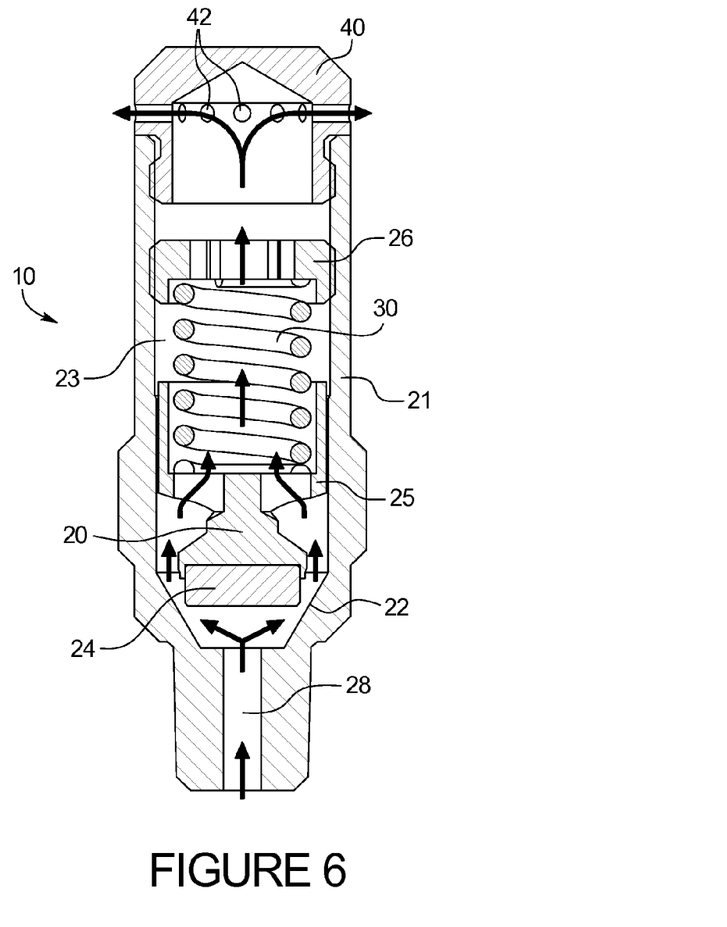
FIG. 6 is a cross-sectional front view of the relief valve showing air flow through the relief valve of FIG. 1.

As seen in FIGS. 3-6, relief valve 10 includes cap 40 having the plurality of passages 42. Cap 40 is depicted in this embodiment as being generally round. The plurality of passages 42 changes the direction of, and distributes, the flow of gas flowing out of relief valve 10. Each passage has its own axis that is formed to be generally perpendicular to the central axis 12 of the valve body 21, along which fluid will flow when relief valve 10 is open. Passages 42 are therefore configured to reduce the velocity of the gas escaping relief valve 10 and to reduce the noise associated with the escaping gas. FIG. 5 is a cross-sectional view of cap 40 that is taken along Section 5-5 from FIG. 4. FIG. 5 illustrates the plurality of passages 42, and specifically twelve evenly-spaced passages around the circumference of cap 40. The use of numerous, smaller passages such as the twelve depicted in this embodiment reduces the noise produced by relief valve 10 without reducing flow of the gas being released through relief valve 10. For example, a configuration of twelve passages each having a diameter of 0.067 inch provides sufficient flow and achieves satisfactory lower noise levels for a typical cryogenic container. Such configurations may, for example, allow relief valve 10 to achieve reduced noise levels that meet the noise requirements of OSHA described herein. The use of additional passages having an even smaller diameter is also contemplated. FIG. 6 shows the flow of gas coming up through valve inlet 28 from container 100, up through a body of relief valve 10, and distributed out of the plurality of passages 42 in cap 40.

A further advantage to aid in reducing noise is designing valve inlet 28 to have a smaller diameter. The diameter of valve inlet 28 is less than that of an inlet of other first relief valves used in cryogenic containers. One example of an orifice diameter for valve inlet 28 as contemplated herein is 0.141 inch. Other valve inlets for use in these applications have been known to have an orifice diameter of 0.281 inch. The reduced diameter of valve inlet 28 reduces the flow of gas entering into relief valve 10, so that the velocity and volume of gas flowing out of the plurality of passages 42 is reduced, which translates to reduced noise of the gas when it is released through the plurality of passages 42. Even so, valve inlet 28 is still sized appropriately to allow sufficient flow of gas being release out of container 100, but the reduced diameter of valve inlet 28 when compared to an inlet of other known relief valves provides decreased gas flow and is therefore able to achieve reduced noise.

The noise reduction features of relief valve 10 may reduce discharge noise of pressurized gas being released through the plurality of passages 42 to within a range of normal conversation and within the OSHA noise exposure requirements of 90 decibels per 8 hour period. Accordingly, relief valve 10 described herein provides a solution for placement and storage of cryogenic containers where noise level is of importance, such as research, hospital and other settings where the containers are stored or installed near employees and/or work areas.

Figure 1:
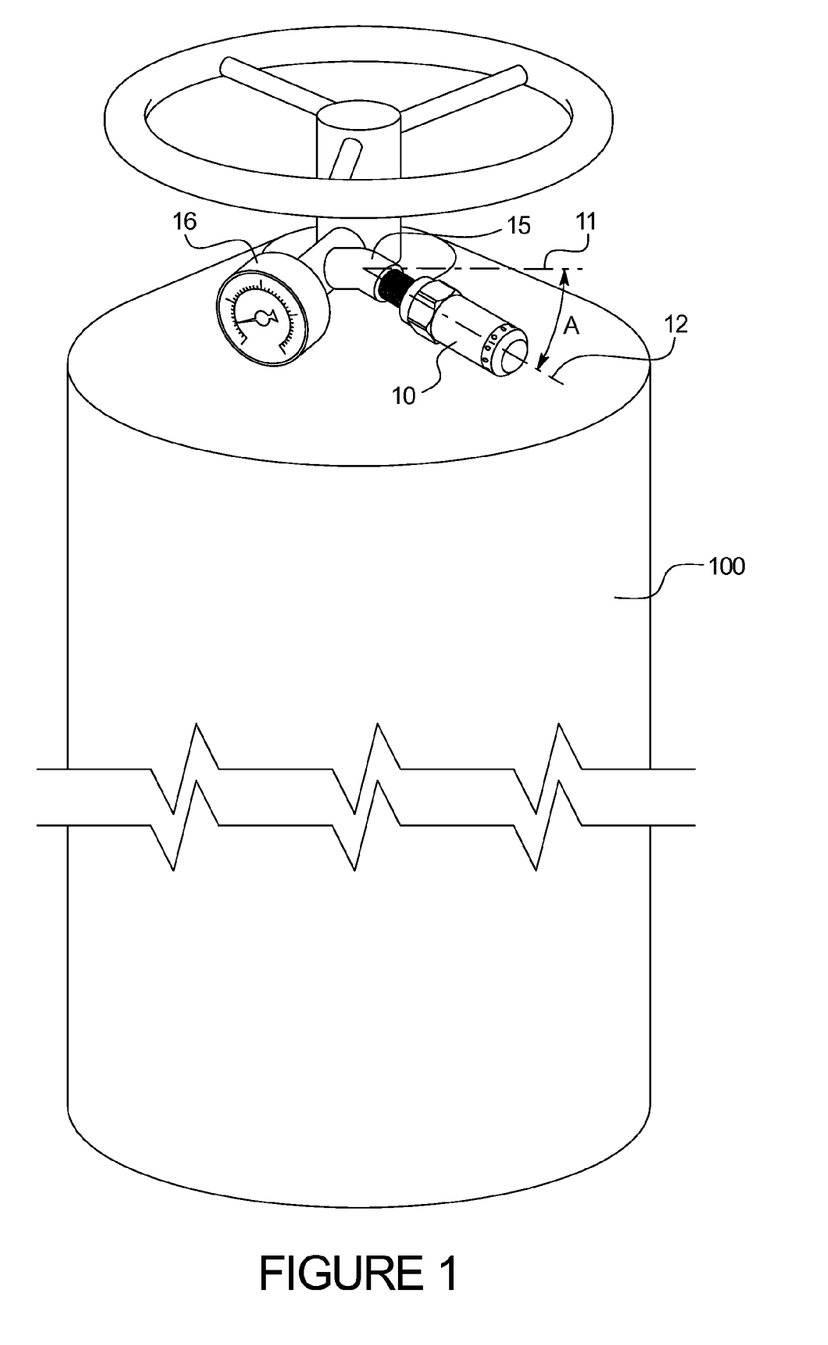
FIG. 1 illustrates a cylinder having installed a relief valve in accordance with the present disclosure.
Figure 2A:
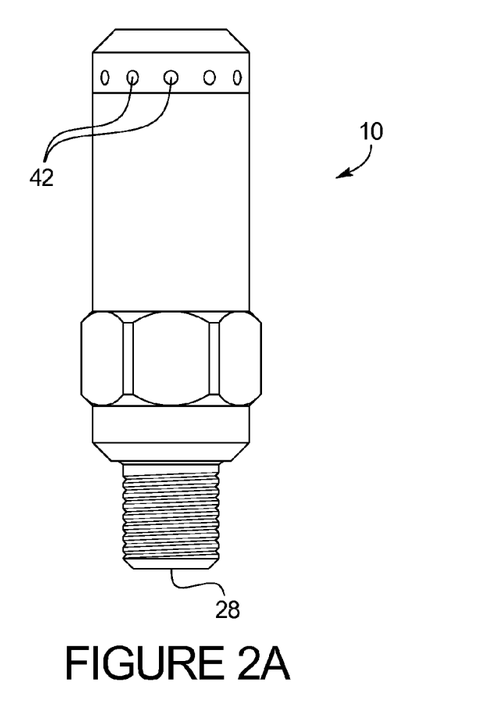
FIG. 2A is a front view of the relief valve of FIG. 1.
Figure 2B:
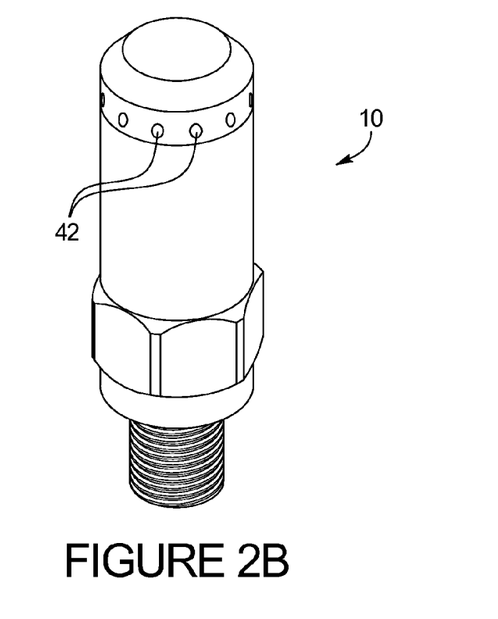
FIG. 2B is a top perspective view of the relief valve of FIG. 1.

The passages 42 of cap 40 also provide a further advantage of redirection of the gas flowing from relief valve 10. FIG. 1 illustrates container 100 having relief valve 10 installed in relief outlet or port 15 in communication with the internal volume of container 100 and disposed adjacent gauge 16. Port 15 has a port central axis 11 that is typically horizontal with respect to ground, and relief valve 10 has a separate valve central axis 12 that is preferably offset slightly lower than horizontal (e.g., 30 degrees below the horizontal port central axis 11). According to some embodiments, angle A may be any angle between 30-0 degrees (where 0 degrees is straight horizontal). The relief valve 10 is installed on its side so that gas being released from one or more of a plurality of passages 42 will not be released directly out towards a side of container 100 where a bystander may be standing.

In addition, FIG. 6 illustrates cap 40 being configured to discharge gas through the plurality of passages 42 at 90 degrees to the valve inlet 28. This configuration enables gas discharging out from passages 42 to not be directed straight out from the container 100. This configuration is further advantageous because only a fraction of the total gas flow discharging out passages 42 is directed towards any given point. If a person were to be close to relief valve 10 at discharge, in line with one of the passages 42, only a small amount of flow would be directed toward them.

Figure 7:
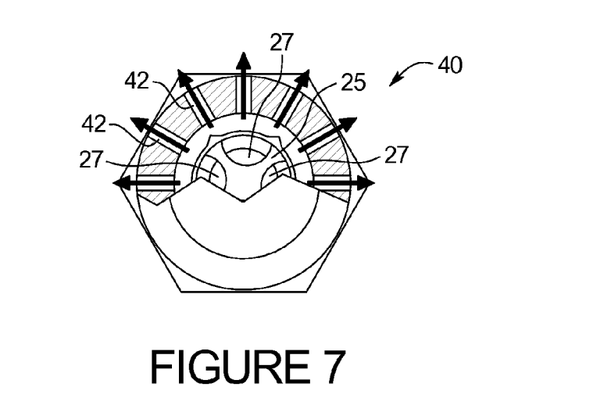
FIG. 7 is a partial cross-sectional top view of the cap portion of the relief valve of FIG. 1 showing air flow through the cap portion.

FIG. 7 illustrates a top view of relief valve 10 and cap 40. In this view, top seat 25 is shown to be designed to have a plurality of flow passages 27 defined by portions of top seat 25 and an inner wall of relief valve 10. The plurality of flow passages 27 aid in directing and/or reducing a flow of pressurized gas through relief valve 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A relief valve configured to be coupled to a relief outlet of a cryogenic container, the relief valve comprising:
   a valve body forming an internal chamber and having a central axis, a proximal end and a distal end;
   an inlet portion located at the proximal end of the valve body and configured to be connected to the internal chamber and to receive content flow from the container, wherein fluid entering the internal chamber from the inlet portion travels in a general direction of the central axis;
   a spring and a moveable poppet disposed in the internal chamber, wherein a spring force exerted by the spring biases the poppet towards the inlet portion;
   an adjustable spring top disposed in the internal chamber and engaged with the spring opposite the moveable poppet, the adjustable spring top comprising a fluid passage; and
   a cap configured to be connected to the distal end of the valve body, the cap comprising a plurality of passages for fluid flow, wherein each of the plurality of passages has a separate passage axis that is generally perpendicular to the central axis, the cap defining a conical void located above, and in fluid communication with, the plurality of passages.

2. The relief valve of claim 1, wherein the inlet portion comprises an inlet orifice having a diameter sized to reduce content flow into the relief valve from the container.

3. A relief valve for coupling to a relief port of a container, wherein the relief port has a port central axis, the relief valve comprising:
   a valve body forming an internal chamber and having a valve central axis, a proximal end and a distal end, wherein the valve central axis is angled at a non-zero angle between 0 and 30 degrees with respect to the port central axis;
   an inlet portion located at the proximal end of the valve body and configured to be connected to the internal chamber and to receive content flow from the container;
   a spring and a moveable poppet assembly disposed in the internal chamber, wherein a spring force exerted by the spring biases the poppet towards the inlet portion; and
   a cap configured to be connected to the distal end of the valve body, the cap comprising a plurality of passages for fluid flow, wherein each of the plurality of passages has a separate passage axis that is generally perpendicular to the valve central axis, and the cap precludes fluid flow in the direction of the valve central axis.

4. The relief valve of claim 3, wherein the port central axis is generally horizontal with respect to the ground, and the non-zero angle is defined with respect to a horizontal reference plane parallel to the ground such that the distal end of the valve body points toward the ground.

5. The relief valve of claim 4, further comprising an adjustable spring top disposed in the internal chamber and in contact with the spring and configured to move towards and away from the inlet portion to increase and decrease, respectively, the spring force exerted by the spring onto the poppet, the spring top being disposed entirely below the cap.

6. The relief valve of claim 5, wherein each of the plurality of passages are cylindrical and radially extending.

7. The relief valve of claim 6, wherein the cap defines a conical void with an apex intersecting the central axis, the conical void being in fluid communication with the internal chamber.

8. A pressurized container assembly comprising:
   a pressurized tank comprising an internal volume and a relief port connected to the internal volume, the relief port having a port central axis; and
   a relief valve configured to couple to the relief port, the relief valve comprising:
      a valve body forming an internal chamber and having a valve central axis, a proximal end and a distal end, wherein the valve central axis is angled at a non-zero angle with respect to the port central axis;
      an inlet portion located at the proximal end of the valve body and configured to be connected to the internal chamber and to receive content flow from the pressurized tank;
      a spring and a moveable poppet assembly disposed in the internal chamber, wherein a spring force exerted by the spring biases the poppet assembly towards the inlet portion, and wherein the poppet assembly comprises a seat disc configured to engage with a valve seat in the internal chamber to close the relief valve when the spring force exceeds a container pressure within the container;
      an adjustable spring top disposed in the internal chamber and in contact with the spring and configured to move towards and away from the inlet portion to increase and decrease, respectively, the spring force exerted by the spring onto the seat disc, the adjustable spring top comprising a fluid passage; and a cap configured to be connected to the distal end of the valve body, the cap comprising a plurality of passages for fluid flow, wherein each of the plurality of passages has a separate passage axis that is generally perpendicular to the valve central axis, and wherein the cap further comprises structure to preclude fluid flow in the direction of the valve central axis.

9. The pressurized container assembly of claim 8, wherein the non-zero angle is between 0 and 30 degrees, the port central axis is generally horizontal with respect to the ground, and the non-zero angle is defined with respect to a horizontal reference plane parallel to the ground such that the distal end of the valve body points toward the ground.

10. The pressurized container assembly of claim 9, wherein the cap defines a conical void in fluid communication with, the internal chamber; and
each of the plurality of passages are cylindrical and radially extending.

11. A valve comprising:
a valve body defining an internal chamber, a central axis, a proximal end, and a distal end, the valve body comprising an inlet portion located at the proximal end thereof, the inlet portion configured to fluidly communicate with the internal chamber and to receive fluid from a source;
a spring biasing a moveable poppet;
an adjustable spring top disposed in the internal chamber and engaged with the spring opposite the moveable poppet, the adjustable spring top comprising a fluid passage; and
a cap connected to the valve body, the cap defining (a) a plurality of fluid passages, each of the plurality of fluid passages having a respective fluid passage axis, each of the fluid passage axes being generally perpendicular to the central axis and (b) a conical void in fluid communication with the plurality of fluid passages.

12. The valve of claim 11, wherein the central axis intersects an apex of the conical void.

13. The valve of claim 11, wherein the conical void has a triangular cross section.

14. The valve of claim 11, wherein the poppet comprises a seat disc configured to engage a valve seat, the spring biasing the seat disc toward engagement with the valve seat.

15. The valve of claim 14, wherein the spring top is closer to the proximal end of the valve body than any portion of the cap.

16. The valve of claim 14, wherein the inlet portion defines an inlet orifice, the poppet being configured such that when the seat disc engages the valve seat, the poppet is external to the inlet orifice.

17. The valve of claim 11, wherein each of the plurality of fluid passages are cylindrical and radially extending.

18. The valve of claim 15, wherein the seat disc is a cylindrical and solid block of material, a center of the seat disc being in the solid block of material.

19. The valve of claim 11, wherein an outer surface of the cap is threaded to an inner surface of the valve body, the inner surface of the valve body at least partially defining the internal chamber.

20. The valve of claim 11, wherein the plurality of fluid passages are cylindrical, and each of the plurality of fluid passages has an inner end configured to accept fluid flow from the internal chamber and an outer end configured to exhaust the accepted fluid;
a radial thickness of the valve body taken in a reference plane disposed between the spring top and the cap being less than a radial length of at least one of the plurality of fluid passages, the radial length being a radial distance from the inner end to the outer end of the at least one fluid passage.

21. The valve of claim 11, wherein the plurality of fluid passages are cylindrical, each of the plurality of fluid passages having an inner end configured to accept fluid flow from the internal chamber and an outer end configured to exhaust the accept fluid; and
an outer surface of the cap being flush with an outer surface of the valve body, such that a reference radius defined between a central axis of the cap and any one of the outer ends of the plurality of fluid passages is equal to a reference radius defined between the central axis of the valve body and the outer surface of the valve body.

22. A pressurized container assembly comprising:
a pressurized tank defining an internal cavity and comprising a relief port in fluid communication with the internal cavity, the relief port having a port central axis;
the valve of claim 11, the valve being coupled to the relief port and serving as a relief valve for the pressurized tank, wherein the central axis of the valve is disposed at a non-zero angle with respect to the port central axis such that the central axis of the valve, after extending through the valve body and the cap, intersects ground.

23. A container assembly comprising:
a tank defining an internal cavity for holding pressurized fluid and comprising a relief port in fluid communication with the internal cavity;
the valve of claim 11 coupled to the relief port and serving as a relief valve for the tank, the valve being oriented such that the central axis of the valve, after extending through the valve body and the cap, intersects ground.

24. The container assembly of claim 22, wherein the internal chamber is pressurized with a gas phase fluid, the relief port is in fluid communication with the gas phase fluid, and the valve is configured to vent the gas phase fluid to ambient via the plurality of fluid passages.

* * * * *

UNITED STATES PATENT AND TRADEMARK OFFICE
CERTIFICATE OF CORRECTION

PATENT NO. : 9,939,072 B2  
APPLICATION NO. : 14/854296  
DATED : April 10, 2018  
INVENTOR(S) : Aaron Dominic Wyatt Page 1 of 1

It is certified that error appears in the above-identified patent and that said Letters Patent is hereby corrected as shown below:

In the Specification

Column 2, Line 55, "valve of FIG." should be changed to --valve of FIG. 1--.

Signed and Sealed this
Twenty-eighth Day of August, 2018

Andrei Iancu
*Director of the United States Patent and Trademark Office*